(12) United States Patent
Ogawa

(10) Patent No.: US 8,384,242 B2
(45) Date of Patent: Feb. 26, 2013

(54) METHOD FOR CONTROLLING INTERCONNECTION SYSTEM

(75) Inventor: Koji Ogawa, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 13/036,257

(22) Filed: Feb. 28, 2011

(65) Prior Publication Data

US 2011/0198930 A1 Aug. 18, 2011

Related U.S. Application Data

(63) Continuation of application No. PCT/JP2009/066613, filed on Sep. 25, 2009.

(60) Provisional application No. 61/101,169, filed on Sep. 30, 2008.

(51) Int. Cl.
*H02J 1/00* (2006.01)

(52) U.S. Cl. .............. 307/43; 307/48; 320/101; 290/44; 290/55; 429/50; 429/61

(58) Field of Classification Search .................... 307/43, 307/48; 320/101; 290/44, 55; 429/50, 61
See application file for complete search history.

(56) References Cited

U.S. PATENT DOCUMENTS

| | | | | |
|---|---|---|---|---|
| 6,724,097 | B1 * | 4/2004 | Wobben ......................... | 290/44 |
| 6,747,370 | B2 * | 6/2004 | Abe ................................ | 307/66 |
| 2001/0043013 | A1 * | 11/2001 | Abe ................................ | 307/66 |
| 2007/0100506 | A1 * | 5/2007 | Teichmann .................... | 700/297 |
| 2008/0076010 | A1 * | 3/2008 | Sato ................................. | 429/61 |
| 2008/0179887 | A1 | 7/2008 | Kawazoe et al. | |
| 2008/0206626 | A1 * | 8/2008 | Tamakoshi et al. ............. | 429/61 |
| 2008/0224541 | A1 * | 9/2008 | Fukuhara ........................ | 307/48 |

FOREIGN PATENT DOCUMENTS

| | | |
|---|---|---|
| CN | 101232192 A1 | 7/2008 |
| EP | 1 156 573 A2 | 5/2011 |
| JP | 2001-298872 A1 | 10/2001 |
| JP | 2003-317808 A1 | 11/2003 |
| JP | 2005-130572 A1 | 5/2005 |

OTHER PUBLICATIONS

Chinese Office Action dated Dec. 18, 2012.

* cited by examiner

*Primary Examiner* — Jared Fureman
*Assistant Examiner* — Alfonso Perez Borroto
(74) *Attorney, Agent, or Firm* — Burr & Brown

(57) ABSTRACT

An interconnected system that supplies power to a power system, and includes a power generator that changes in output, and an electric power storage-compensation device. The interconnected system is controlled so that operation of a sodium-sulfur battery that is included in the electric power storage-compensation device and compensates for a change in output of the power generator is stopped, or the interconnected system is set in a non-power transmission mode in which a planned power generation value of a power generation schedule is set to the sum of power generated by the power generator and local load power of the system, when the planned power generation value is 0 kW or less, and the sum of the power generated by the power generator and the local load power of the system has reached a value at which power is supplied to the interconnected system from the power system.

4 Claims, 4 Drawing Sheets

METHOD FOR CONTROLLING INTERCONNECTION SYSTEM

BACKGROUND OF THE INVENTION

1. Field of Invention

The present invention relates to a method of controlling an interconnected system that supplies power to a power system, and includes a power generator (e.g., wind power generator) that changes in output, in combination with an electric power storage-compensation device that includes a sodium-sulfur battery.

2. Description of Related Art

In recent years, a natural-energy power generator that generates power using wind, solar power, geothermal energy, or the like has attracted attention, and has been put to practical use. A natural-energy power generator is a clean power generator that utilizes an inexhaustible natural energy source instead of limited resources (e.g., petroleum), and can suppress carbon dioxide emissions. Therefore, companies, autonomies, and the like have increasingly employed a natural-energy power generator in view of prevention of global warming.

However, since the amount of natural energy obtained varies from hour to hour, a natural-energy power generator inevitably changes in output. This is an obstacle to widespread use of a natural-energy power generator. Therefore, when employing a natural-energy power generator, it is preferable to construct an interconnected (power generation) system by combining the natural-energy power generator with an electric power storage-compensation device that mainly includes a plurality of secondary batteries.

In particular, a sodium-sulfur battery among the other secondary batteries has a high energy density, achieves a high output within a short time, and exhibits a rapid response. Therefore, a sodium-sulfur battery may suitably be used to compensate for a change in output of a natural-energy power generator that may occur of the order of several hundred milliseconds to several seconds by providing a bidirectional converter that controls charging and discharging in combination with the sodium-sulfur battery. In other words, an interconnected system that includes a natural-energy power generator and an electric power storage-compensation device that includes a plurality of sodium-sulfur batteries is a desirable power generation system.

Since a natural-energy power generator changes in output, an electric power storage-compensation device frequently receives and outputs power. That is, a sodium-sulfur battery that is included in the electric power storage-compensation device is repeatedly charged and discharged. This makes it difficult to accurately manage the battery level of the sodium-sulfur battery, so that it may suddenly become impossible to charge or discharge the sodium-sulfur battery (e.g., the operation of the sodium-sulfur battery stops when compensating for a change in output of the natural-energy power generator). Various methods have been disclosed to control a sodium-sulfur battery that is included in an electric power storage-compensation device (see JP-A-2003-317808, for example).

The sodium-sulfur battery that is included in the electric power storage-compensation device of the interconnected system suppresses or eliminates a change in power generation schedule that is designated manually or using a computer or the like taking account of a change in natural energy power generation. The interconnected system plans a power generation schedule based on predicted natural-energy power generation and the battery level, and supplies power from the interconnected system to the power system according to the power generation schedule. When it is impossible to generate power using natural energy (e.g., no wind) for a long time, the planned power generation value is normally set to 0 kW (i.e., power is not supplied to the power system). In this case, however, it is necessary to supply power to the local load of the interconnected system. Therefore, the sodium-sulfur battery is discharged to supply power to the local load, so that the battery level decreases.

For example, when using an interconnected system 8 shown in FIG. 1 that includes a wind power generator 7 (natural-energy power generator), an electric power storage-compensation device 5, and a local load 11, in the case where the planned power generation value is 0 kW (see FIG. 4) (i.e., power $P_T$ (thick solid line in FIG. 4) measured by a wattmeter 48 is 0 kW), a sodium-sulfur battery 3 is charged when power $P_A + P_C$ (broken line in FIG. 4) has exceeded 0 kW. On the other hand, when the power $P_A + P_C$ is less than 0 kW, the sodium-sulfur battery 3 is discharged to compensate for lack of power, so that the battery level decreases.

In this case, the amount of power to be discharged can be reduced (i.e., a decrease in battery level can be suppressed) by setting the planned power generation value to a value at which power is supplied to the interconnected system from the power system 1 (see FIG. 5). In this case, the interconnected system 8 is charged from the power system 1. In other words, the interconnected system 8 which should charge power to the power system 1 is supplied power from the power system 1. This situation is not preferred.

When the planned power generation value is set to a value at which power is supplied to the interconnected system from the power system 1 (i.e., power $P_T$ is set to be a negative value), the sodium-sulfur battery is charged when the power $P_A + P_C$ has exceeded the planned power generation value. However, when the power $P_A + P_C$ has exceeded the planned power generation value, but is less than 0 kW, the sodium-sulfur battery 3 is charged from the power system 1. On the other hand, when the power $P_A + P_C$ is less than the planned power generation value, the sodium-sulfur battery 3 is discharged, so that the battery level decreases.

As shown in FIG. 6, power generated using natural energy and the local load power may be monitored, and a situation in which the sodium-sulfur battery 3 is charged from the power system may be prevented by changing the power generation schedule. However, this increases burden on the operator.

The present invention was conceived in view of the above problems. An object of the present invention is to provide a method of controlling an interconnected system that can suppress a decrease in battery level of a sodium-sulfur battery when it is impossible to generate power using natural energy for a long time.

SUMMARY OF THE INVENTION

The inventors of the present invention conducted extensive studies in order to achieve the above object. As a result, the inventors found that the above object can be achieved by stopping the operation of the sodium-sulfur battery, or setting the planned power generation value of the power generation schedule of the interconnected system to the sum of power generated by the power generator and the local load power of the interconnected system. This finding has led to the completion of the present invention. Specifically, the present invention provides the following method of controlling an interconnected system.

[1] A method of controlling an interconnected system that supplies power to a power system, and includes a power generator that changes in output, and an electric power storage-compensation device, the method comprising stopping operation of a sodium-sulfur battery that is included in the electric power storage-compensation device and compensates for a change in output of the power generator, or setting the interconnected system in a non-power transmission mode in which a planned power generation value of a power generation schedule of the interconnected system is set to the sum of power generated by the power generator and local load power of the interconnected system, when the planned power generation value is 0 kW or less, and the sum of the power generated by the power generator and the local load power of the interconnected system has reached a value at which power is supplied to the interconnected system from the power system.

[2] The method according to [1], wherein the planned power generation value is set to 0 kW in the non-power transmission mode when the sum of the power generated by the power generator and the local load power of the interconnected system has temporarily reached a value at which power is supplied to the power system from the interconnected system.

According to the method of controlling an interconnected system according to the present invention, when it is impossible to generate power using natural energy for a long time, a decrease in battery level of the sodium-sulfur battery can be suppressed by stopping the operation of the sodium-sulfur battery, or setting the planned power generation value of the power generation schedule of the interconnected system to the sum of the power generated by the power generator and the local load power of the interconnected system (i.e., setting the interconnected system in the non-power transmission mode). Therefore, power generated using natural energy can be effectively utilized.

DETAILED DESCRIPTION OF THE INVENTION

Exemplary embodiments of the present invention are described below. Note that the present invention is not limited to the following embodiments. Various modifications and improvements of the design may be made based on the common knowledge of a person having ordinary skill in the art without departing from the scope of the present invention.

Figure 1:
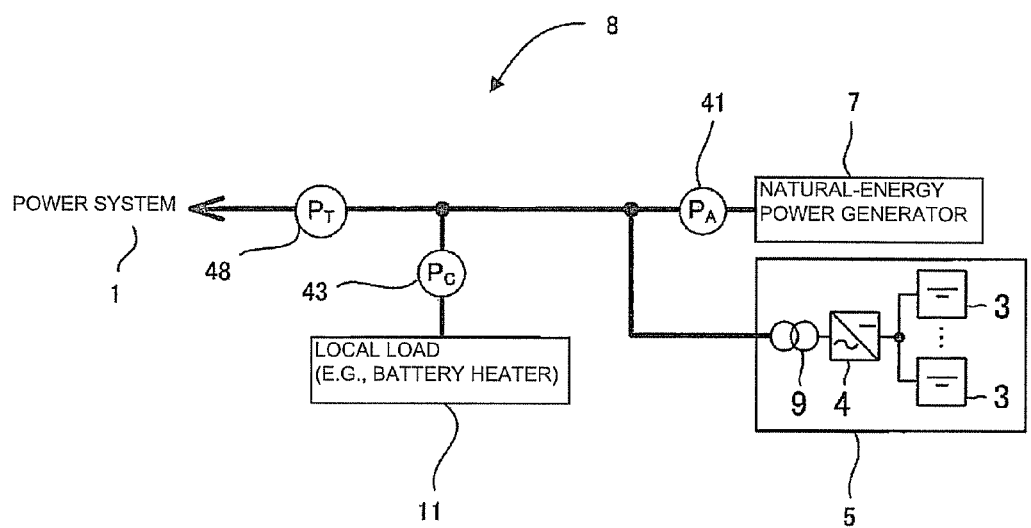
FIG. 1 is a system configuration diagram showing an example of an interconnected system that includes a power generator that changes in output, and an electric power storage-compensation device.

An interconnected system is described below. FIG. 1 is a system configuration diagram showing an example of an interconnected system that includes a power generator that changes in output, and an electric power storage-compensation device. An interconnected system 8 shown in FIG. 1 includes a natural-energy power generator 7 (e.g., wind power generator or solar power generator), an electric power storage-compensation device 5, and a local load 11. The electric power storage-compensation device 5 includes a sodium-sulfur battery 3 (i.e., a secondary battery that can store power, and can be charged and discharged), a bidirectional converter 4 having a dc/ac conversion function, and a transformer 9. The bidirectional converter 4 may include a chopper and an inverter, or may include an inverter, for example.

The interconnected system 8 includes the natural-energy power generator 7 and the sodium-sulfur battery 3 (electric power storage-compensation device 5). One or a plurality of sodium-sulfur batteries 3 included in the electric power storage-compensation device 5 are collectively referred to as "sodium-sulfur battery 3". The interconnected system 8 normally includes a heater for the sodium-sulfur battery 3 and other auxiliaries (e.g., computer and lighting device) as the local load 11.

As shown in FIG. 1, the interconnected system 8 includes a wattmeter 41 that measures power $P_A$ generated by the natural-energy power generator 7. The interconnected system 8 also includes a wattmeter 43 that measures power $P_C$ consumed by the local load, and a wattmeter 48 that measures power $P_A + P_B + P_C$ $(=P_T)$ (where, $P_B$ is power output from the electric power storage-compensation device 5). The power direction from the interconnected system 8 to a power system 1 is referred to as a positive direction (+).

The interconnected system 8 plans a power generation schedule based on predicted natural-energy power generation and the battery level, and supplies power from the interconnected system 8 to the power system 1 according to the power generation schedule. In other words, the interconnected system 8 is controlled so that the power $P_T$ measured by the wattmeter 48 coincides with a planned power generation value of the power generation schedule.

Therefore, the interconnected system 8 is configured so that the electric power storage-compensation device 5 charges and discharges the sodium-sulfur battery 3 such that the power $P_B$ output from the electric power storage-compensation device 5 compensates for a change in power generated by the natural-energy power generator 7 (power $P_A$ measured by the wattmeter 41) and power consumed by the local load 11 (power $P_C$ measure by the wattmeter 43). The power $P_T$ measured by the wattmeter 48 and the power $P_A$ measured by the wattmeter 41 are input to the electric power storage-compensation device 5, and charging/discharging of the sodium-sulfur battery 3 is controlled based on the input values. Specifically, charging/discharging of the sodium-sulfur battery 3 (i.e., power $P_B$) is controlled so that power output from the interconnected system 8 (power $P_T$ measure by the wattmeter 48) satisfies the planned power generation value (i.e., $P_T = P_A + P_B + P_C$). This makes it possible to supply the power $P_T$ output from the interconnected system 8 as a whole (hereinafter may be referred to as "total power PT") to the power system 1 as stable and high-quality power. Note that the local load 11 includes a heater for the sodium-sulfur battery 3, a control power supply, and the like.

In the interconnected system 8, the electric power storage-compensation device 5 charges the sodium-sulfur battery 3 based on a change in power $P_A$ generated by the natural-energy power generator 7. Specifically, charging/discharging of the sodium-sulfur battery 3 (i.e., power $P_B$) is controlled so that the power $P_B$ satisfies the relationship $P_B = P_T - (P_A + P_C)$ to compensate for a change in power $P_A$. This makes it possible to adjust the power $P_T$ output from the interconnected system 8 as a whole to the planned power generation value.

When charging or discharging the sodium-sulfur battery 3, the electric power storage-compensation device 5 charges or discharges the sodium-sulfur battery 3 by changing the amount of control (control target value) of the bidirectional converter 4 based on the output (power $P_A$) from the natural-energy power generator 7 so that power that compensates for a change in output (power $P_A$) from the natural-energy power generator 7 is input or output. A change in output from the natural-energy power generator 7 is thus absorbed. Since stable and high-quality power can be supplied using the natural-energy power generator 7 and the sodium-sulfur battery 3 (electric power storage-compensation device 5) that discharge only a small amount of carbon dioxide, the interconnected system 8 is a preferable power generation system.

Figure 2:
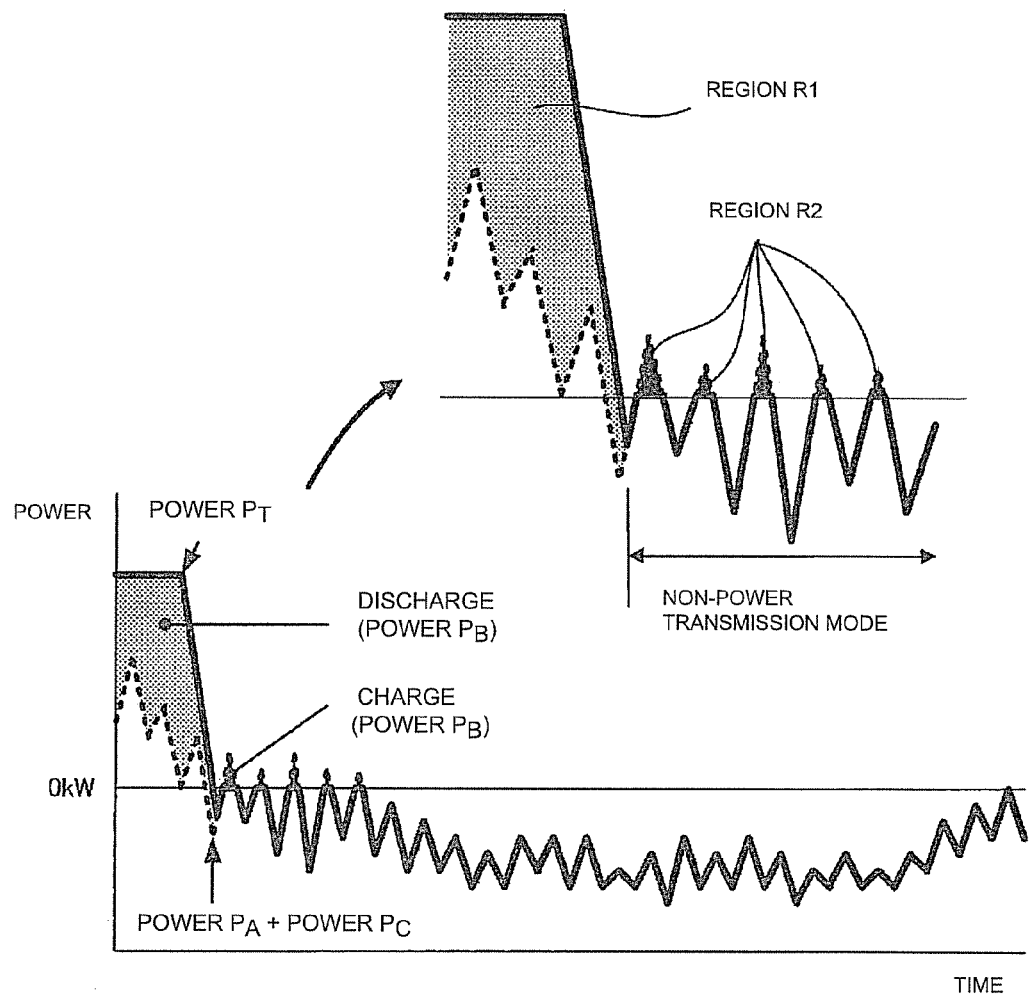
FIG. 2 is a graph schematically showing an example of a method of controlling an interconnected system according to the present invention.

A power control method for the sodium-sulfur battery 3 when adjusting power supplied to the power system from the interconnected system 8 shown in FIG. 1 to the planned power generation value (set value) is described below with reference to FIG. 2. In FIG. 2, the horizontal axis indicates time, and the vertical axis indicates power. A thick solid line indicates the power $P_T$, and a broken line indicates $P_A+P_C$. FIG. 2 shows the case where the interconnected system 8 is set in a non-power transmission mode when the planned power generation value=0 kW and $P_A+P_C<0$ (see the enlarged view). A region R1 is a region in which the sodium-sulfur battery 3 is discharged ($P_B>0$), and a region R2 is a region in which the sodium-sulfur battery 3 is charged ($P_B<0$).

In the interconnected system 8, the sodium-sulfur battery 3 is charged or discharged so that the power $P_T$ measured by the wattmeter 48 coincides with the planned power generation value. In the method of controlling an interconnected system according to the present invention, the operation of the sodium-sulfur battery 3 that is included in the electric power storage-compensation device 5 and compensates for a change in output of the power generator is stopped when the planned power generation value is 0 kW or less, and the sum of the power $P_A$ generated by the power generator and the local load power $P_C$ of the interconnected system has reached a value at which power is supplied to the interconnected system from the power system ($P_A+P_C<0$ kW), as shown in FIG. 2. Alternatively, the planned power generation value of the interconnected system is set to the sum ($P_A+P_C$) of the power $P_A$ generated by the power generator and the local load power $P_C$ of the interconnected system. The interconnected system 8 is preferably set in the non-power transmission mode when it is impossible to generate power using natural energy for a long time. The power $P_T$ measured by the wattmeter 48 becomes $P_A+P_C$ by setting the interconnected system 8 in the non-power transmission mode. Therefore, discharging of the sodium-sulfur battery 3 is stopped (i.e., a decrease in battery level does not occur).

In FIG. 2, the planned power generation value is initially set to a given value larger than 0 kW. In the region R1, the sodium-sulfur battery 3 is discharged since the power $P_A+P_C$ is exceeded (before setting the interconnected system 8 in the non-power transmission mode). When it is impossible to generate power using natural energy for a long time, the planned power generation value is set to $P_A+P_C$ (i.e., the interconnected system 8 is controlled so that the power $P_T$ becomes $P_A+P_C$) (i.e., the thick solid line coincides with the broken line) when the planned power generation value is 0 kW or less, and the interconnected system 8 has been set in the non-power transmission mode. Therefore, the sodium-sulfur battery 3 is not charged/discharged. The planned power generation value is set to 0 kW when the sum of the power generated by the power generator and the local load power of the interconnected system has temporarily reached a value at which power is supplied to the power system from the interconnected system. In other words, the planned power generation value is set to 0 kW (the operation of the sodium-sulfur battery 3 is resumed if the operation of the sodium-sulfur battery 3 is halted) when $P_A+P_C$ has exceeded 0 kW, and the sodium-sulfur battery 3 is charged (see the region R2).

Figure 3:
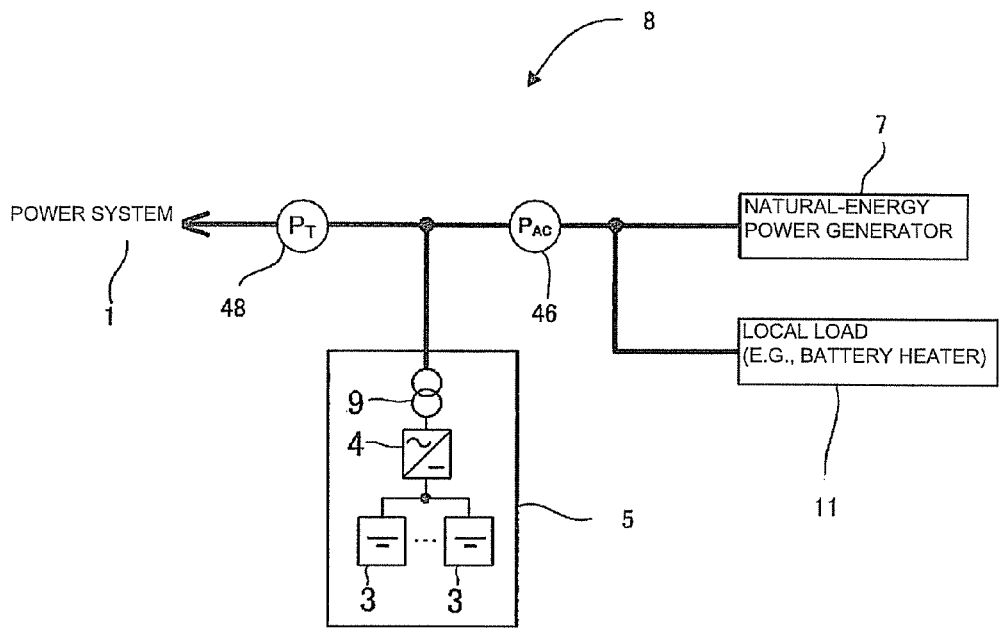
FIG. 3 is a system configuration diagram showing another example of an interconnected system that includes a power generator that changes in output, and an electric power storage-compensation device.
Figure 4:
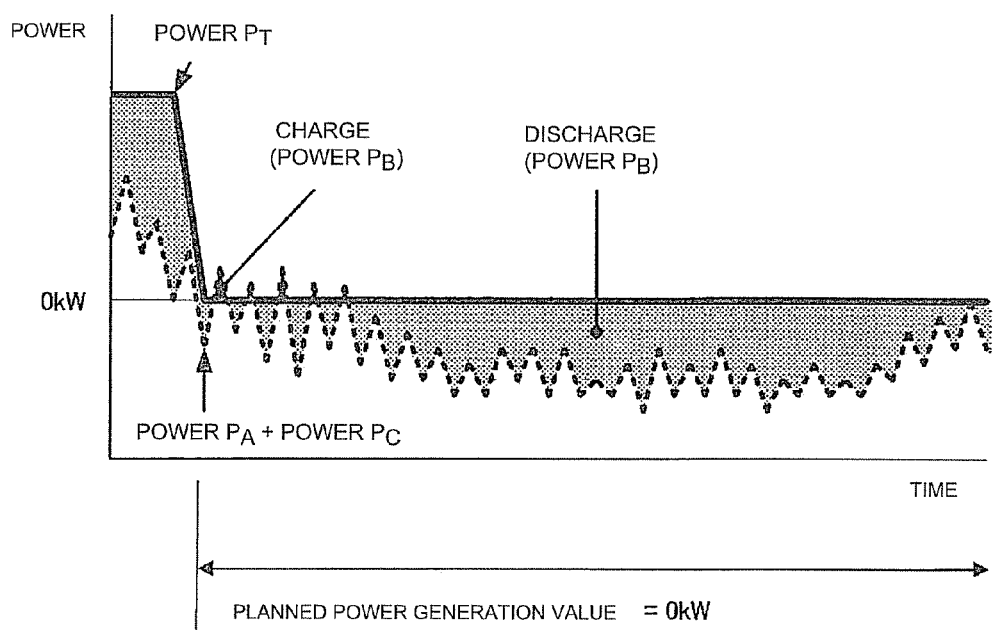
FIG. 4 is a graph schematically showing an example of a method of controlling an interconnected system according to a comparative example.
Figure 5:
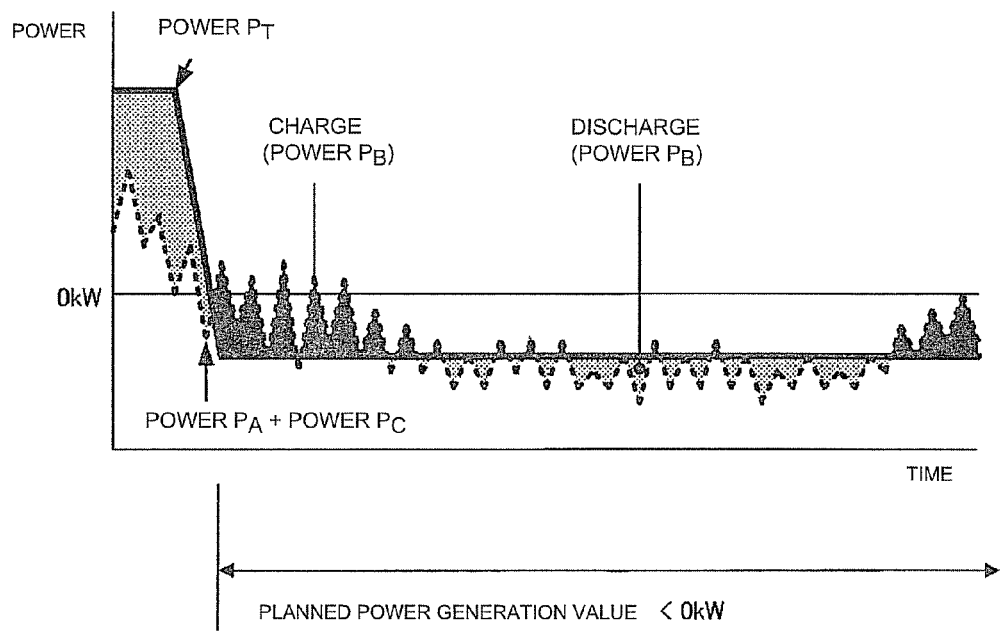
FIG. 5 is a graph schematically showing an example of a method of controlling an interconnected system according to another comparative example.
Figure 6:
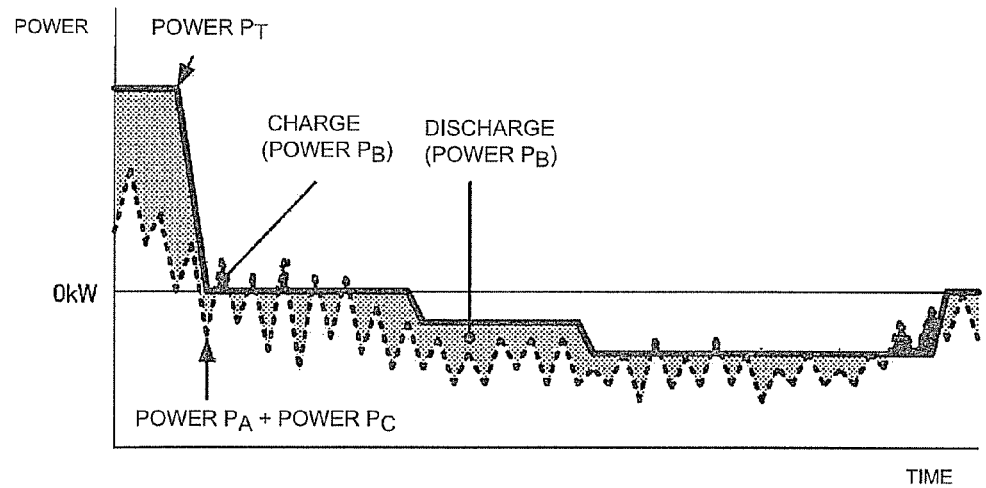
FIG. 6 is a graph schematically showing an example of a method of controlling an interconnected system according to yet another comparative example.

FIG. 3 is a system configuration diagram showing another example of an interconnected system that includes a power generator that changes in output, and an electric power storage-compensation device. An interconnected system 8 shown in FIG. 3 includes the natural-energy power generator 7, the electric power storage-compensation device 5, and the local load 11 in the same manner as in FIG. 1.

As shown in FIG. 3, the interconnected system 8 also includes a wattmeter 46 that measures power $P_A+P_C$ ($=P_{AC}$) (where, $P_A$ is power output from the natural-energy power generator 7, and $P_C$ is power consumed by the local load 11). The interconnected system 8 also includes a wattmeter 48 that measures power $P_A+P_B+P_C$ ($=P_T$) (where, $P_B$ is power output from the electric power storage-compensation device 5).

In this embodiment, discharging of the sodium-sulfur battery 3 (i.e., power $P_B$) is controlled so that the power $P_T$ measure by the wattmeter 48 satisfies the planned power generation value (i.e., $P_T=P_A+P_B+P_C$) set by the power generation schedule in the same manner as in the embodiment described with reference to FIGS. 1 and 2. The operation of the sodium-sulfur battery 3 that is included in the electric power storage-compensation device 5 and compensates for a change in output of the power generator is stopped when the planned power generation value is 0 kW or less, and the sum of the power $P_A$ generated by the power generator and the local load power $P_C$ of the interconnected system has reached a value at which power is supplied to the interconnected system from the power system ($P_A+P_C<0$ kW). Alternatively, the planned power value of the power generation schedule of the interconnected system is set to the sum of the power $P_A$ generated by the power generator and the local load power $P_C$ of the interconnected system (non-power transmission mode).

According to the method of controlling an interconnected system according to the present invention, when it is impossible to generate power using natural energy for a long time, the operation of the sodium-sulfur battery is stopped, or the planned power generation value of the power generation schedule of the interconnected system is set to non-power transmission mode where the sum of the power generated by the power generator and the local load power of the interconnected system, when the planned power generation value is 0 kW or less. A decrease in battery level of the sodium-sulfur battery can be suppressed by setting the interconnected system in the non-power transmission mode.

Industrial Applicability

The method of controlling a secondary battery according to the present invention may be used as a method of controlling an interconnected system that supplies power to a power system, and includes a power generator that generates power using natural energy (e.g., wind, solar power, or geothermal energy) and changes in output, and an electric power storage-compensation device that includes a plurality of sodium-sulfur batteries.

Explanation of Symbols

1: power system,
3: sodium-sulfur battery,

4: bidirectional converter,
5: electric power storage-compensation device,
7: wind power generator,
8: interconnected system,
9: transformer,
11: local load,
41, 43, 46, 48: wattmeter

The invention claimed is:

1. A method of controlling an interconnected system that supplies power to a power system, the interconnected system comprising a power generator that changes in output, a local load of the interconnected system, and an electric power storage-compensation device that includes at least one sodium sulfur battery, the method comprising:

determining and setting a planned value for a power generation schedule of the interconnected system based on a predicted power to be generated by the power generator, the local load and the at least one sodium sulfur battery of the electric power storage-compensation device, and when power from the power generator is unavailable for an extended period of time, a sum of power generated by the power generator and the local load is less than 0 kW and power is supplied to the interconnected system from the power system, the method further comprises one of (i) stopping operation of the at least one sodium sulfur battery of the electric power storage-compensation device and (ii) setting the interconnected system into a non-power transmission mode, where the planned value for the power generation schedule output by the interconnected system is equal to a sum of power generated by the power generator and the local load.

2. The method of claim 1, further comprising charging the at least one sodium sulfur battery of the electric power storage-compensation device using the power generated in excess of 0 kW when the interconnected system is in the non-power transmission mode and the sum of power generated by the power generator and the local load is greater than 0 kW.

3. The method of claim 1, further comprising resetting the planned sum of power generated by the power generator and the local load to 0 kW when power from the power generator is unavailable for an extended period of time.

4. The method of claim 1, further comprising charging the at least one sodium sulfur battery of the electric power storage-compensation device using power from the power system when the sum of power generated by the power generator and the local load exceeds the planned value for the power generation schedule and the planned value for the power generation schedule is less than 0 kW.

* * * * *